(12) United States Patent
Takeda et al.

(10) Patent No.: US 11,284,401 B2
(45) Date of Patent: Mar. 22, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Xu Zhang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/483,303

(22) PCT Filed: Feb. 2, 2018

(86) PCT No.: PCT/JP2018/003548
§ 371 (c)(1),
(2) Date: Aug. 2, 2019

(87) PCT Pub. No.: WO2018/143397
PCT Pub. Date: Aug. 9, 2018

(65) Prior Publication Data
US 2020/0015235 A1    Jan. 9, 2020

(30) Foreign Application Priority Data
Feb. 3, 2017    (JP) .............................. JP2017-018953

(51) Int. Cl.
*H04W 72/04*    (2009.01)
*H04B 7/0456*    (2017.01)
(Continued)

(52) U.S. Cl.
CPC ...... *H04W 72/0493* (2013.01); *H04B 7/0456* (2013.01); *H04L 5/0051* (2013.01); *H04L 5/10* (2013.01); *H04W 72/1273* (2013.01)

(58) Field of Classification Search
CPC .......... H04W 72/0493; H04W 72/1273; H04B 7/0465; H04L 5/0051; H04L 5/10
See application file for complete search history.

(56) References Cited

U.S. PATENT DOCUMENTS

| 9,549,400 B2 | 1/2017 | Seo et al. |
| 2013/0064196 A1 | 3/2013 | Gao et al. |

(Continued)

FOREIGN PATENT DOCUMENTS

WO    WO-2013070145 A1 *  5/2013  .......... H04W 72/042

OTHER PUBLICATIONS

International Search Report issued in corresponding International Application No. PCT/JP2018/003548 dated Apr. 17, 2018, with translation (3 pages).

(Continued)

*Primary Examiner* — Elton Williams
(74) *Attorney, Agent, or Firm* — Osha Bergman Watanabe & Burton LLP

(57) ABSTRACT

The present invention is designed to reduce the deterioration of communication quality and so on even when communication is performed by applying different configurations than in existing LTE systems. A receiving section that receives a downlink control channel, and a control section that controls receipt of the down link control channel, are provided, the downlink control channel is transmitted using downlink control channel elements including a plurality of resource element groups (REGs), and the control section controls receiving processes per REG group comprised of a plurality of REGs.

3 Claims, 14 Drawing Sheets

(51) Int. Cl.
*H04L 5/00* (2006.01)
*H04L 5/10* (2006.01)
*H04W 72/12* (2009.01)

(56) References Cited

U.S. PATENT DOCUMENTS

2013/0242947 A1    9/2013   Chen et al.
2014/0233474 A1*   8/2014   Wu ................... H04W 72/042
                                                      370/329
2014/0314038 A1   10/2014   Seo et al.
2019/0132180 A1*   5/2019   Hosseini ............ H04L 27/2647

OTHER PUBLICATIONS

Written Opinion of the International Searching Authority issued in corresponding International Application No. PCT/JP2018/003548 dated Apr. 17, 2018 (3 pages).
LG Electronics, "Discussion on control channel design," 3GPP TSG RAN WG1 Meeting NR Ad-Hoc Meeting; R1-1700493; Spokane, WA, USA; Jan. 16-20, 2017 (7 pages).
Office Action issued in the counterpart Japanese Patent Application No. 2018-566115, dated May 8, 2020 (8 pages).
Huawei, HiSilicon; "Design of control resource set"; 3GPP TSG RAN WG1 NR Ad Hoc Meeting, R1-1700014; Spokane, USA, Jan. 16-20, 2017 (5 pages).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 18748354.0, dated Nov. 30, 2020 (9 pages).
Office Action issued in the counterpart European Patent Application No. 18748354.0, dated Jul. 2, 2021 (6 pages).
Office Action issued in Chinese Application No. 201880010091.3; dated Oct. 11, 2021 (14 pages).

* cited by examiner

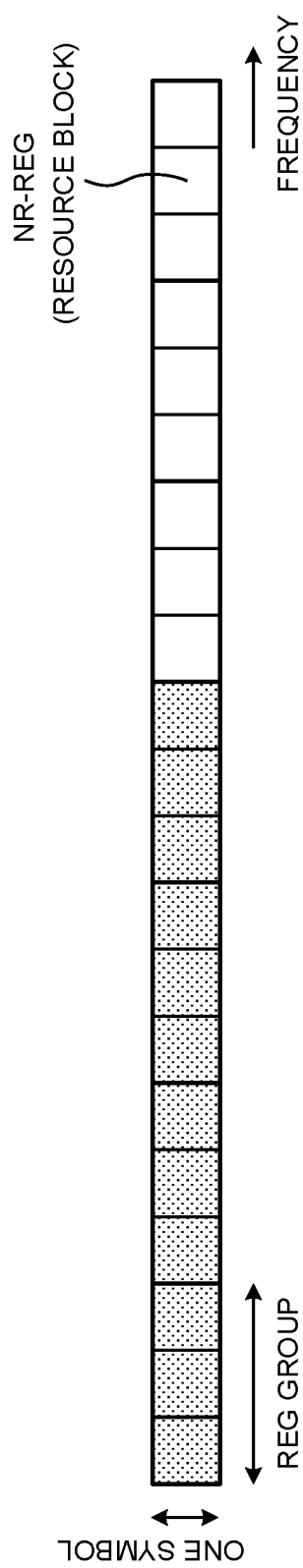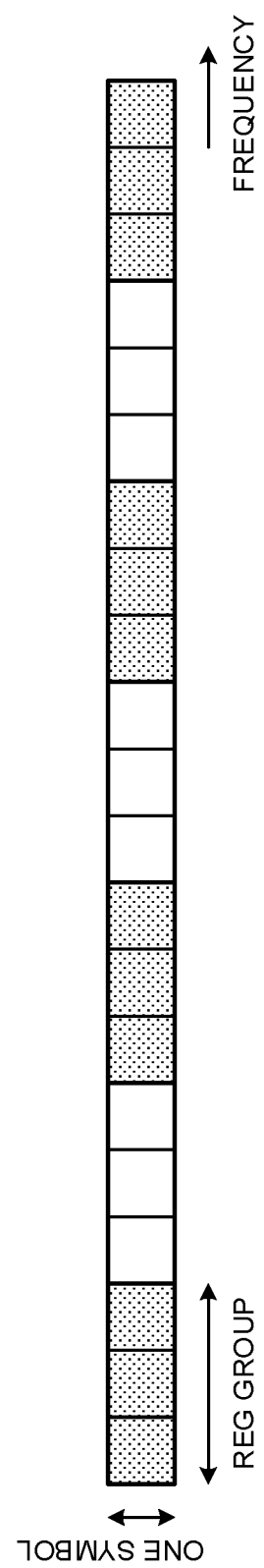
FIG. 3A
FIG. 3B

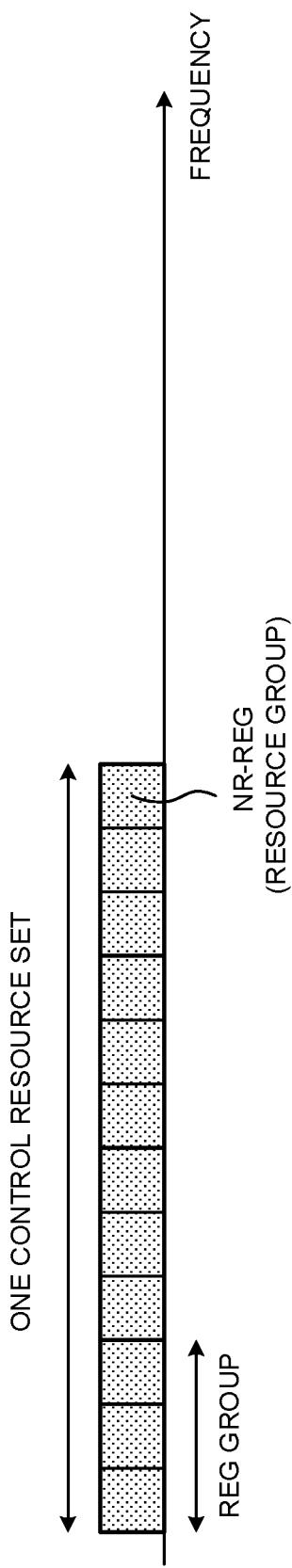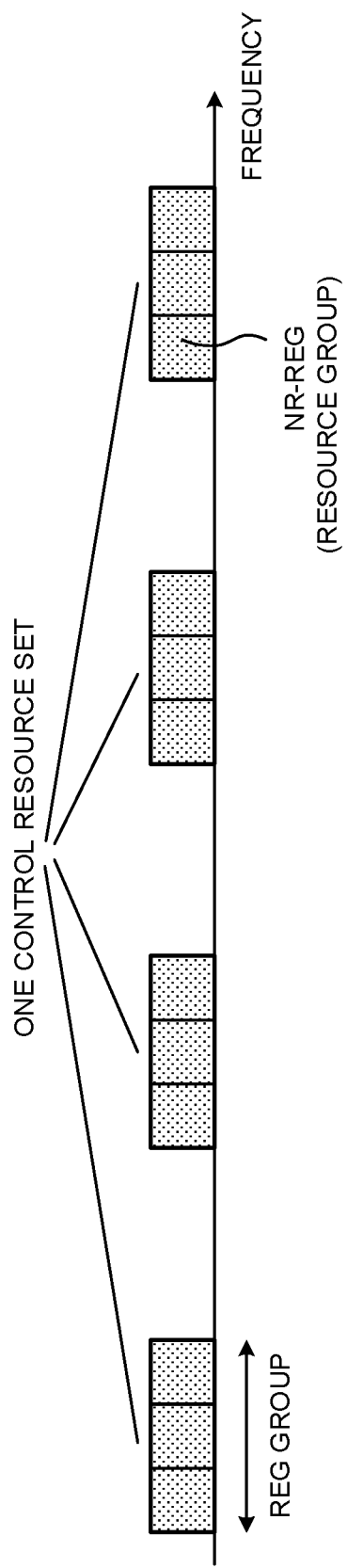

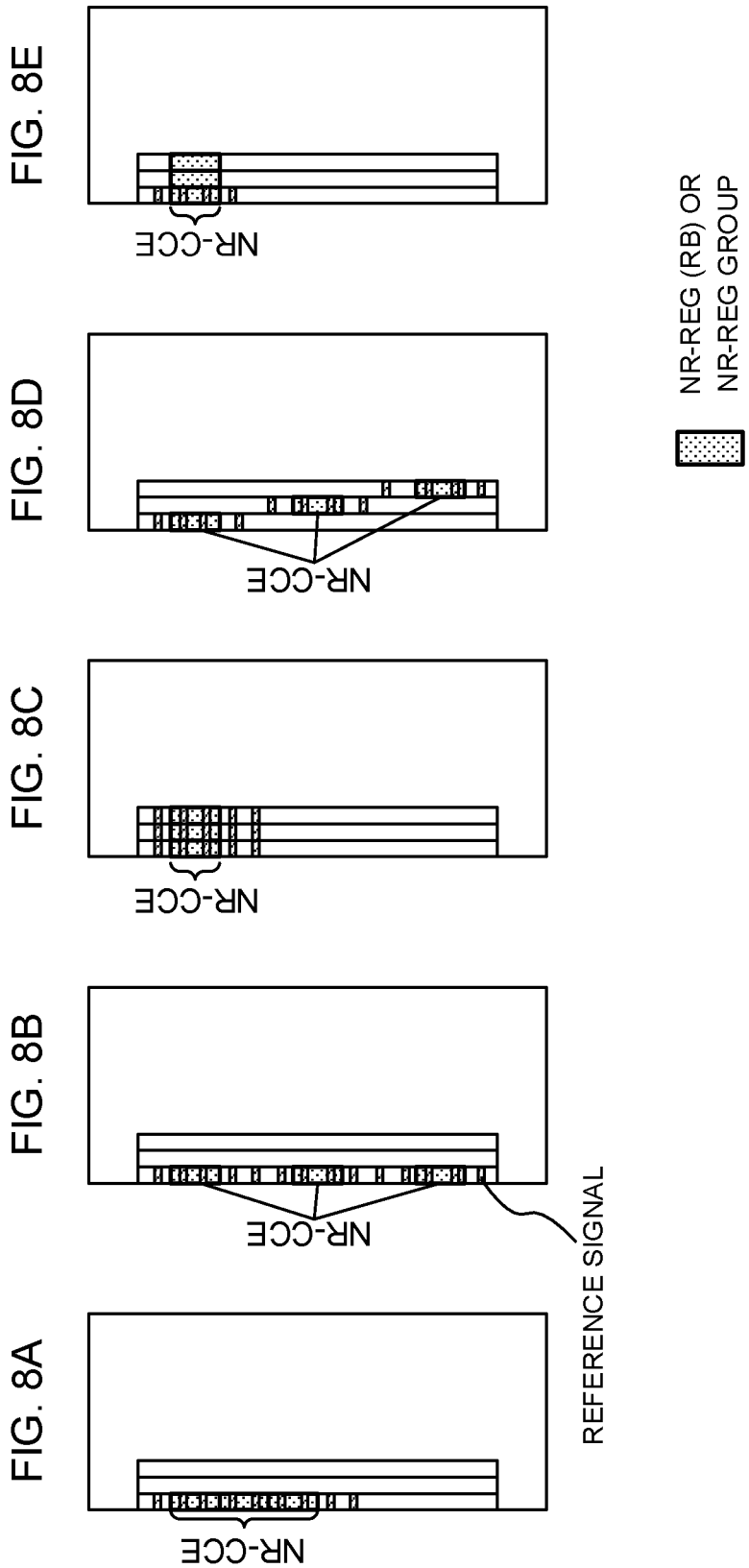

USER TERMINAL AND RADIO COMMUNICATION METHOD

TECHNICAL FIELD

The present invention relates to a user terminal and a radio communication method in next-generation mobile communication systems.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

A radio base station controls the allocation (scheduling) of data for a user terminal, and reports the schedule of data to the user terminal using downlink control information (DCI). The user terminal monitors the downlink control channel (PDCCH) in which the downlink control information is transmitted, performs receiving processes (demodulation process, decoding process, etc.), and controls receipt of DL data and/or transmission of uplink data based on downlink control information that is received.

In downlink control channels (PDCCH/EPDCCH), transmission is controlled using an aggregation of one or more control channel elements (CCEs/ECCEs). Furthermore, each control channel element is constituted by a plurality of resource element groups (REGs/EREGs). Resource element groups are also used when control channels are mapped to resource elements (REs).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010.

SUMMARY OF INVENTION

Technical Problem

Future radio communication systems (for example, LTE Rel. 14, 15 or later versions, 5G, NR, etc.) are assumed to control data scheduling based on different configurations than existing LTE systems (for example, LTE Rel. 13 or earlier versions). To be more specific, future radio communication systems are required to support flexible use of numerologies and frequencies, and realize dynamic frame formats. A "numerology" refers to, for example, a set of communication parameters (for example, subcarrier spacing, bandwidth, etc.) applied when transmitting/receiving certain signals.

Also, for future radio communication systems, a study is under way to configure one REG constituting a control channel element into smaller units and/or narrower fields than in existing LTE systems. In this way, when applying configurations that are different from those of existing LTE systems, if control technique (for example, transmission/ receiving methods) in existing LTE systems are used on an as-is basis, signal may not be appropriately transmitted and/or received (for example, receiving process based on channel estimation cannot be performed properly), and problems such as degradation of communication quality and/or a drop in throughput may occur.

The present invention has been made in view of the above, and it is therefore an object of the present invention to provide a user terminal and a radio communication method that can reduce the deterioration of communication quality and/or others even when communication is performed by applying different configurations than in existing LTE systems.

Solution to Problem

According to one aspect of the present invention, a user terminal a receiving section that receives a downlink control channel, and a control section that controls receipt of the down link control channel, and, in this user terminal, the downlink control channel is transmitted using downlink control channel elements including a plurality of resource element groups (REGs), and the control section controls receiving processes per REG group comprised of a plurality of REGs.

Advantageous Effects of Invention

According to the present invention, the deterioration of communication quality and so on can be reduced even when communication is performed by applying different configurations than in existing LTE systems.

BRIEF DESCRIPTION OF DRAWINGS

FIGS. 3A and 3B are diagrams to show examples of methods of mapping of REG groups;

FIGS. 7A and 7B are diagrams to show examples of configurations of control resource sets;

FIGS. 8A to 8E are diagrams to show RS patterns as arranged in NR-REGs;

DESCRIPTION OF EMBODIMENTS

Figure 1D:
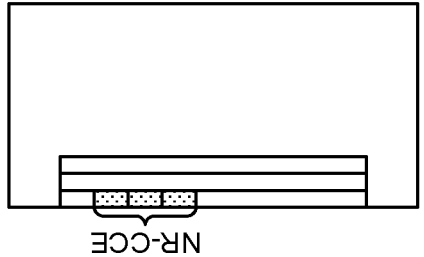
FIGS. 1A to 1D area diagrams to show examples of methods of arranging NR-REGs.

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of downlink control channels.

DCI may be scheduling information, including at least one of, for example, data-scheduling time/frequency resources, transport block information, data modulation scheme information, HARQ retransmission information, demodulation RS information, and so on. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant."

DL assignment and/or UL grant may include information related to the resources, sequences, transmission formats and so on of channels for transmitting UL control signals (UCI: Uplink Control Information) such as HARQ-ACK feedback in response to DL data, channel measurement information (CSI: Channel State Information) and so on. Also, DCI that schedules UL control signals (UCI: Uplink Control Information) may be set forth apart from DL assignments and UL grants.

A UE is configured to monitor a set of a predetermined number of downlink control channel candidates. To "monitor" in this case means, for example, attempting to decode each downlink control channel for a target DCI format, in the set. Such decoding is also referred to as "blind decoding (BD)" or "blind detection." The downlink control channel candidates are also referred to as "BD candidates," "(E) PDCCH candidates," and so on.

The set of downlink control channel candidates (multiple downlink control channel candidates) to be monitored is also referred to as "search space." A base station places DCI in a predetermined downlink control channel candidates included in the search space. The UE performs blind decoding for one or more candidate resources in the search space, and detects the DCI addressed to the UE. The search space may be configured by high layer signaling that is common between users, or may be configured by user-specific high layer signaling. Also, two or more search spaces may be configured, for the user terminal, in the same carrier.

In existing LTE (LTE Rel. 8 to 12), a plurality of aggregation levels (ALs) are provided in a search space for the purpose of link adaptation. The ALs correspond to the numbers of control channel elements (CCEs)/enhanced control channel elements (ECCEs: Enhanced CCEs) that constitute DCI. Also, the search space is configured so that there are multiple downlink control channel candidates for a given AL. Each downlink control channel candidate is comprised of one or more resource units (CCEs and/or ECCEs).

Cyclic redundancy check (CRC) bits are attached to the DCI. The CRC is masked (scrambled) using UE-specific identifiers (for example, cell-radio network temporary identifiers (C-RNTIs)) or a system-common identifier. The UE can detect the DCI where the CRC is scrambled using the C-RNTI for the subject terminal, and the DCI where the CRC is scrambled using the system-common identifier.

Also, search spaces include a common search space, which is configured for UEs on a shared basis, and a UE-specific search space, which is configured per UE. In the UE-specific search space for the existing LTE PDCCH, the ALs (=the numbers of CCEs) are 1, 2, 4 and 8. The numbers of BD candidates defined in association with the ALs=1, 2, 4 and 8 are 6, 6, 2 and 2, respectively.

Now, 5G/NR is required to support flexible use of numerologies and frequencies, and realize dynamic frame formats. Here, a numerology refers to a set of frequency-domain and/or time domain-communication parameters (for example, at least one of the subcarrier spacing (SCS), the bandwidth, the duration of symbols, the duration of cyclic prefixes (CPs), the duration of transmission time intervals (TTIs), the number of symbols per TTI, the format of radio frames, the filtering process, the windowing process and so on).

In 5G, study is in progress to provide services using very high carrier frequencies—for example, maximum 100 GHz. Generally speaking, it becomes more difficult to secure coverage as the carrier frequency increases. The reasons for this include that the distance-induced attenuation becomes more severe and the rectilinearity of radio waves becomes stronger, the transmission power density decreases because ultra-wideband transmission is performed, and so on.

Therefore, in order to meet the demands of the above-noted various types of communication even in high frequency bands, study is in progress to use massive MIMO (massive MIMO (Multiple Input Multiple Output)), which uses a very large number of antenna elements. When a very large number of antenna elements are used, beams (antenna directivity) can be formed by controlling the amplitude and/or the phase of the signals transmitted/received from each element. This process is also referred to as beam "forming (BF)," and it becomes possible to reduce the propagation loss of radio waves.

BF can be classified into digital BF and analog BF. Digital BF refers to a method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF Chains). Meanwhile, it is possible to form a number of beams according to the number of RF chains at an arbitrary timing.

Analog BF refers to a method of using phase shifting devices on RF. In this case, since it is only necessary to rotate the phase of RF signals, analog BF can be realized with simple and inexpensive configurations, but it is nevertheless not possible to form a plurality of beams at the same time. To be more specific, when analog BF is used, each phase shifting device can only form one beam at a time.

It then follows that, if a base station (for example, referred to as an "eNB (evolved Node B)," a "gNB," a "BS (Base Station)" and so on) has only one phase shifting device, only one beam can be formed at a given time. Therefore, when multiple beams are transmitted using analog BF alone, these beams cannot be transmitted simultaneously using the same resources, and the beams need to be switched, rotated and so on, over time.

Note that it is also possible to adopt a hybrid BF configuration which combines digital BF and analog BF. Although study is in progress to introduce massive MIMO in future radio communication systems (for example, 5G), if it is attempted to form an enormous number of beams with digital BF alone, the circuit configuration becomes expensive. Consequently, 5G is assumed to adopt a hybrid BF configuration.

Furthermore, in 5 G/NR, considering that BF may be applied to downlink control channels, reference signals (for example, DM-RSs) for receiving these downlink control channels may have to be introduced. The reference signals for use for receiving downlink control channels may be, for example, UE-specific reference signals (UE-specific DM-RSs) and/or downlink control channel-specific reference signals (PDCCH-specific DM-RSs). In the following description, a reference signal that is used to receive a downlink control channel may be simply referred to an "RS" unless its type is specified.

A user terminal can control receipt of downlink control channels using RSs, at least when BF is applied. For example, a user terminal performs receiving processes (for example, demodulation, decoding process, etc.) of downlink control channels based on the assumption that the same beamforming (or precoding) is applied to reference signals and downlink control channels.

Furthermore, in 5G/NR, a new PDCCH format (NR-PDCCH) is under research. In relationship to the NR-PDCCH, there is an on-going study to form a PDCCH candidate with a CCE (NR-CCE) set, and to form an NR-CCE with multiple REGs (NR-REGs). A study is in progress to form NR-REGs with a size of one RB in a predetermined period (for example, in a period of one symbol).

FIGS. 1A to 1D show examples of methods of arranging NR-REG, respectively. The NR-CCE is comprised of a plurality of NR-REGs (here, three NR-REGs). In the exemplary arrangement shown in FIG. 1A, NR-REGs are arranged only in the first symbol, and an NR-CCE is formed with three NR-REGs that are consecutive in the frequency domain. With this arrangement, it is possible to complete blind decoding on a symbol-by-symbol basis, and to apply different precoding or beamforming to different NR-CCEs arranged in different symbols, so that it is possible to time-multiplex NR-CCEs that are formed by applying precoding or beamforming using a simplified precoding device or a beamforming/transmitting device of a base station.

Figure 1C:
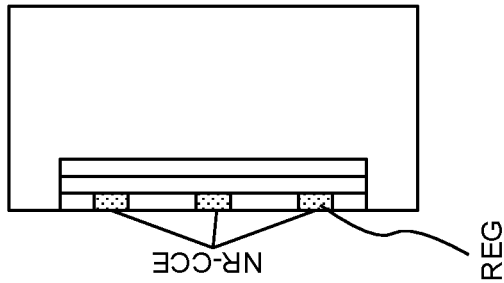
Figure 1B:
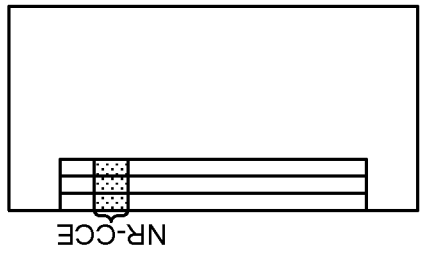
Figure 1A:
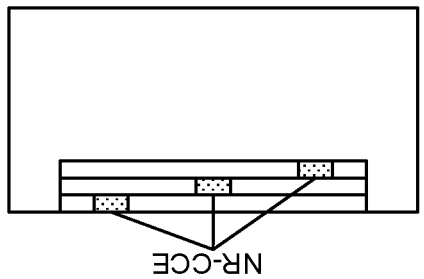

In the exemplary arrangement shown in FIG. 1B, NR-REGs are arranged only in the first symbol, and an NR-CCE is formed with three NR-REGs that are discretely arranged in the frequency domain. This arrangement can provide a frequency diversity gain with the NR-CCE, in addition to having the advantage of the arrangement of FIG. 1A.

In the exemplary arrangement shown in FIG. 1C, NR-REGs are arranged in the same frequency locations in the first to third symbols. According to this arrangement, unlike FIGS. 1A and 1B, one NR-CCE is transmitted using a plurality of symbols, so that its received signal energy can be multiplied by the number of symbols, and, furthermore, different precoding or beamforming can be applied to different symbols in a given NR-CCE, so that it is possible to have a transmission diversity gain by applying precoding or beamforming using a simplified precoding device or a beamforming/transmitting device of a base station.

In the exemplary arrangement shown in FIG. 1D, NR-REGs are arranged in the first to third symbols so as not to overlap with each other in the frequency direction. This arrangement can provide a frequency diversity gain with the NR-CCE, in addition to having the advantage of the arrangement of FIG. 1C.

Figure 2:
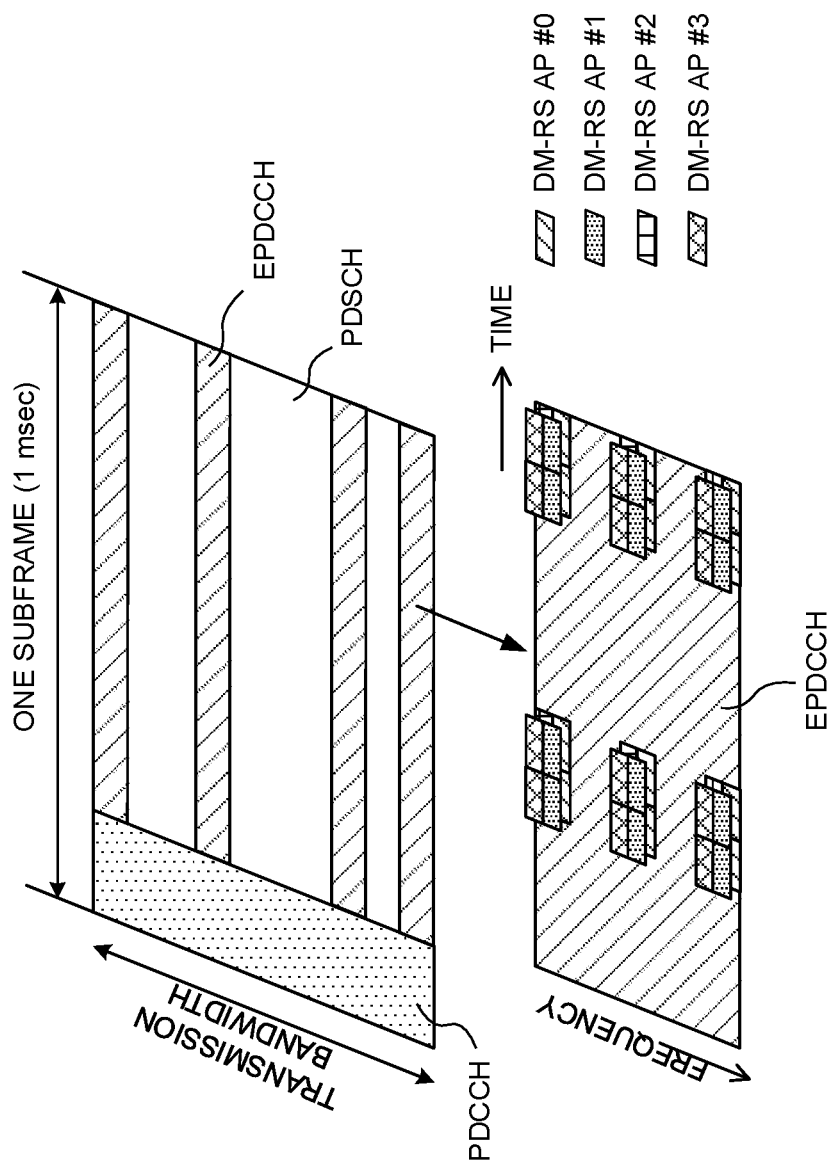
FIG. 2 is a conceptual diagram to show resource allocation for the PDCCH and the EPDCCH and arrangement of DMRSs in an existing LTE system.

FIG. 2 is a conceptual diagram to show resource allocation for the PDCCH and the EPDCCH and an arrangement of DMRSs in an existing LTE system. A PDCCH is allocated to n symbols from the head of a subframe, and an EPDCCH and a PDSCH are frequency multiplexed and arranged in symbol following the symbols in which the PDCCH is allocated. In the PRB where the EPDCCH is allocated, DMRSs are arranged per antenna port (AP #0 to AP #3).

In existing LTE systems, one CCE that is used to transmit a PDCCH is formed with nine REGs, arranged along the frequency direction and/or the time direction. Consequently, channel estimation can be performed using CRSs arranged along the frequency and time directions.

One ECCE that is used to transmit an EPDCCH is arranged in a PRB pair, which is frequency multiplexed with a PDSCH. Since a sufficient number of DMRSs are arranged per antenna port in a PRB pair, channel estimation can be performed using DMRSs.

Meanwhile, assuming 5G/NR, if an NR-REG is comprised of RBs within a predetermined period (for example, one symbol), one NR-REG can be constituted by twelve REs. While it may be possible to allocate an increased amount of reference signals to REs in an NR-REG so as to improve the accuracy of channel estimation, allocating an increased amount of reference signals may lead to increased overhead, and may even limit the resources that are available for downlink control channels. Meanwhile, if there are few reference signals, the accuracy of channel estimation deteriorates, which may lead to a degradation of communication quality.

The present inventors have focused on the fact that reference signals that can be used for receiving processes such as channel estimation can be reserved by grouping multiple NR-REGs, and come up with the idea of controlling receiving processes per REG group comprised of multiple REGs.

Now, embodiments of the present invention will be described below in detail with reference to the accompanying drawings. Note that the radio communication methods according to each embodiment may be applied individually or may be applied in combination.

First Aspect

According to a first aspect of the present invention, a system in which PDCCH candidates of NR-PDCCH are configured by NR-CCE set, and NR-CCE is configured by a plurality of NR-REGs, the base station transmits an NR-PDCCH in which a plurality of NR-REGs are grouped. Furthermore, the user terminal performs receiving processes on a per NR-REG group basis, and performs channel estimation and demodulates DCI (NR-PDCCH).

The user terminal may be configured to have a receiving section for receiving a downlink control channel (NR-PDCCH), and a control section for controlling receipt of the downlink control channel, and the control section may be configured to control the receiving processes of NR-REGs on a REG group basis.

One REG group may include a plurality of NR-REGs that are arranged consecutively in the frequency domain. An NR-REG is comprised of a bandwidth of one RB (for example, twelve subcarriers) in a predetermined symbol period. In the following description, an NR-REG will be comprised of a bandwidth of one RB within one symbol period, but this is by no means limiting.

In the user terminal, the control section may perform channel estimation on a per REG group basis. For example, assume that a single type of precoding or beamforming is applied to a plurality of NR-REGs in an REG group on the base station side. This makes it possible to perform channel estimation using RSs arranged in these multiple NR-REGs, and to find the average (or filter) of the channel estimation values in the REG group.

The base station may switch the beamforming and/or the precoding to apply to a downlink control channel on a per REG group basis. Meanwhile, the user terminal divides the received signals of the downlink control channel per REG group, and finds the average of channel estimation values per REG group. Then, the user terminal demodulates data based on the channel estimation values.

According to the first aspect, receiving processes are performed on a per REG group basis, and this can raise the possibility that the number of RSs that can be used for channel estimation increases compared to the case where channel estimation is performed per RB, and improve the accuracy of channel estimation. Furthermore, since receiving processes are performed on a per REG group basis, it is possible to find the average of channel estimation values per REG group, so that precoding, beamforming and so on can be applied flexibly, compared to the case where the average of channel estimation values is determined over the entire system band.

FIGS. 3A and 3B show examples of mapping of REG groups. FIG. 3A shows localized mapping, in which mapping is performed such that a plurality of REG groups are arranged consecutively in the frequency domain. The vertical direction is one OFDM symbol, and the horizontal direction is the system band (or a band shorter than the system band). As shown in this drawing, one NR-REG assumed in the NR-PDCCH is comprised of a bandwidth of one RB (for example, twelve subcarriers) in one OFDM symbol period.

In the example shown in FIG. 3A, one REG group is formed with three NR-REGs. Multiple REG groups (in FIG. 3A, four groups are illustrated) are arranged consecutively in the frequency domain (localized mapping). The demodulation reference signal (RS) may be placed in at least one of the resource elements that constitute an REG group.

FIG. 3B shows distributed mapping, in which mapping is performed so that a plurality of REG groups are distributed and arranged in the frequency domain. In the example shown in FIG. 3B, one REG group is formed with three NR-REGs. Multiple REG groups (in FIG. 3B, four groups are illustrated) are distributed and arranged in the frequency domain. The demodulation reference signal (RS) may be placed in at least one of the resource elements that constitute an REG group.

Although FIGS. 3A and 3B show examples in which one REG group is constituted by three NR-REGs, the size of an REG group (the number of NR-REGs that constitute one REG group) may be fixed, or may be changed flexibly.

When the size of an REG group is fixed, for example, the size of an REG group may be determined in the standard, and the size defined in the standard may be applied to all cases on a fixed basis.

The size of an REG group can be configured flexibly, and may be determined based on rules, metrics and others. Now, specific examples of methods of determining the size of an REG group based on rules will be listed below.

(1) The size of an REG group may be determined based on the transmission method (transmit diversity, UE-specific beamforming, etc.) for the NR-PDCCH and others.

(2) The size of an REG group may be determined based on the resource mapping scheme (localized mapping, distributed mapping, etc.) for the NR-PDCCH and others.

(3) The size of an REG group may be determined based on the aggregation level of CCEs.

(4) The size of an REG group may be determined based on the bandwidth of a control resource set. A control resource set refers to a resource frame containing CCEs, PDCCH and others.

(5) The size of an REG group may be determined depending on whether the NR-PDCCH that is monitored is UE group-common or UE-specific.

(6) The size of an REG group may be determined based on numerologies (for example, subcarrier spacing) of the NR-PDCCH to be monitored.

(7) The size of an REG group may be determined based on the carrier frequency where the NR-PDCCH is transmitted.

The size of an REG group can be determined using any one or any combination of above methods (1) to (7). Alternatively, the size of an REG group may be determined by a method other than the above methods.

Also, the size of one REG group may be configured in the user terminal by RRC signaling.

Beamforming or precoding may be applied to the NR-PDCCH on a per REG group basis. Beam forming or precoding that is implemented per REG group will be explained in detail.

Figure 4:
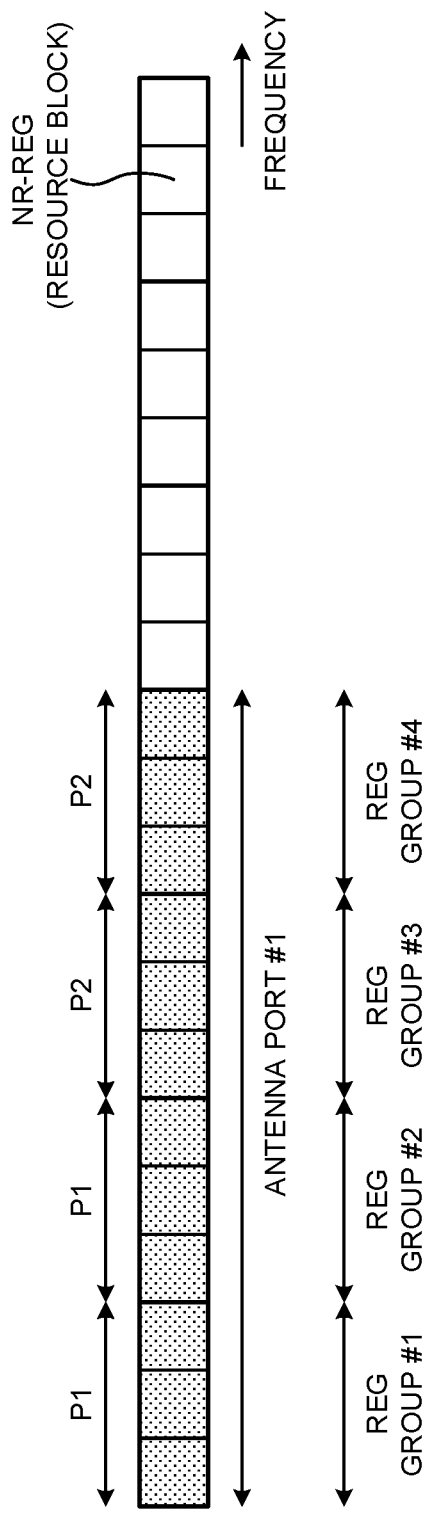
FIG. 4 is a diagram to show another example of the method of mapping REG groups.

With reference to FIG. 4 now, precoding (or beamforming) for REG groups that are mapped by localized mapping will be described. A plurality of REG groups #1 to #4 are arranged consecutively in a predetermined frequency field in the system band. User-specific precoders are applied to the NR-PDCCHs allocated to these REG groups #1 to #4. The user-specific precoders (or beamforming) may be determined based on CSI feedback from the user terminals. The same antenna port (AP1) is assigned to one NR-PDCCH candidate (or one NR-CCE candidate).

The same precoder (or beamforming) may be applied to the same REG group, while different precoders (or beamforming) may be applicable to different REG groups. In the example shown in FIG. 4, the first precoder (P1) is applied to two REG groups #1 and #2, and a second precoder (P2) is applied to two other REG groups #3 and #4. Beam forming can also be applied to each REG group as with precoders. The base station selects and applies precoders (or beamforming) on a per REG group basis.

The user terminal performs receiving processes on a per REG group basis, and finds the average (or filter) of the channel estimation values acquired from the RSs included in each REG group, for each REG group. Following this, the user terminal demodulates the REs in each REG group by using the channel estimation value of each REG group.

To be more specific, the base station implements different pre-codings using first and second precoders P1 and P2. The base station uses precoder P1 for REG groups #1 and #2, and applies precoder P2 to REG groups #3 and #4. Even if the user terminal does not know which precoder the base station uses, the user terminal can still perform receiving processes on a per REG group basis and perform channel estimation for each REG group, so that the REs can be demodulated correctly.

In this way, one DCI can be transmitted by applying a plurality of precoders/beamforming, so that a beam diversity effect can be achieved.

Figure 5A:
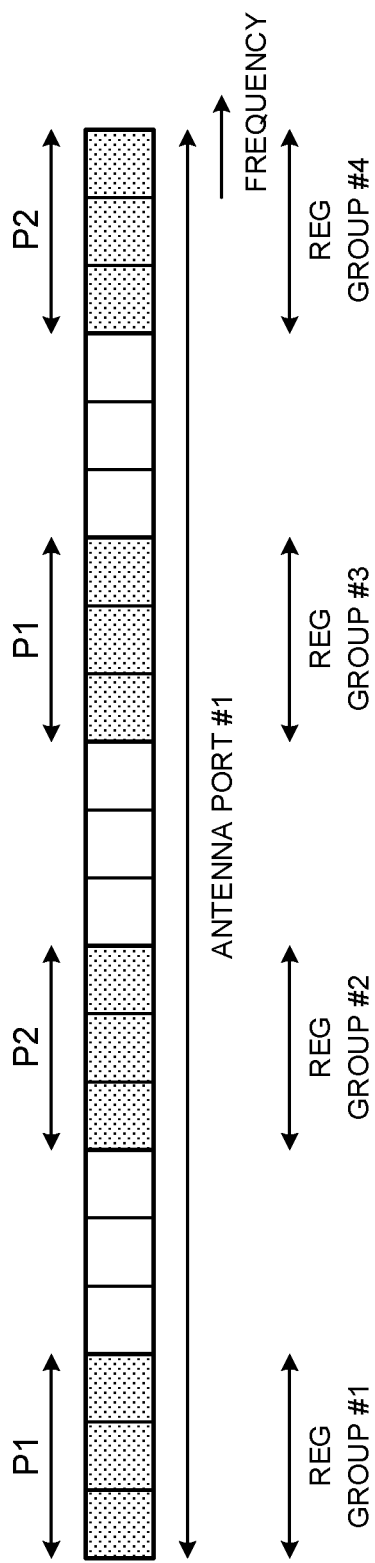
FIGS. 5A and 5B are diagrams to show precoding/ beamforming and assignment of antenna ports for REG groups.
Figure 5B:
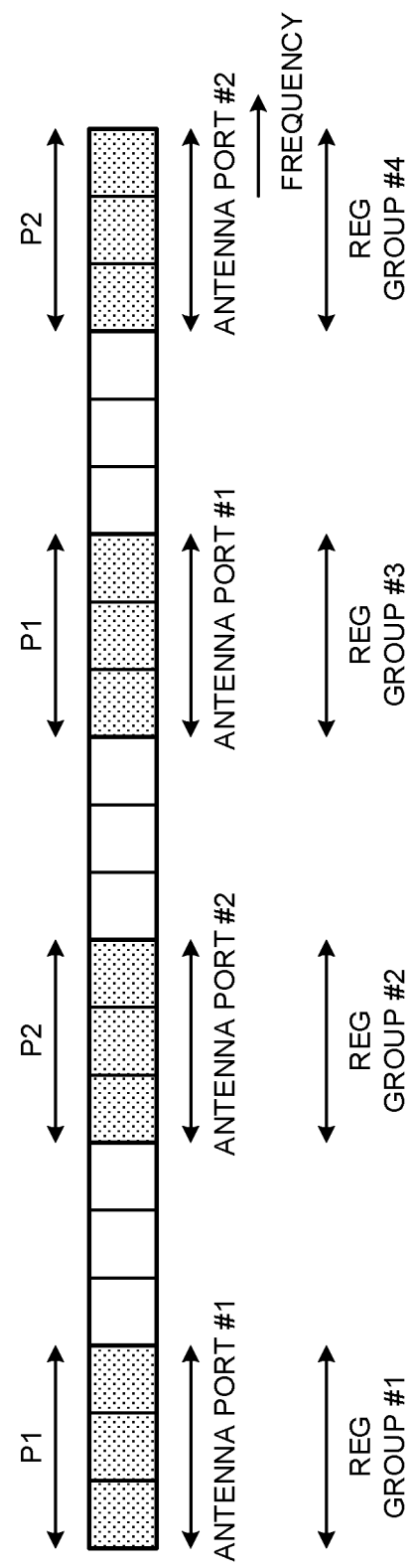
Figure 6:
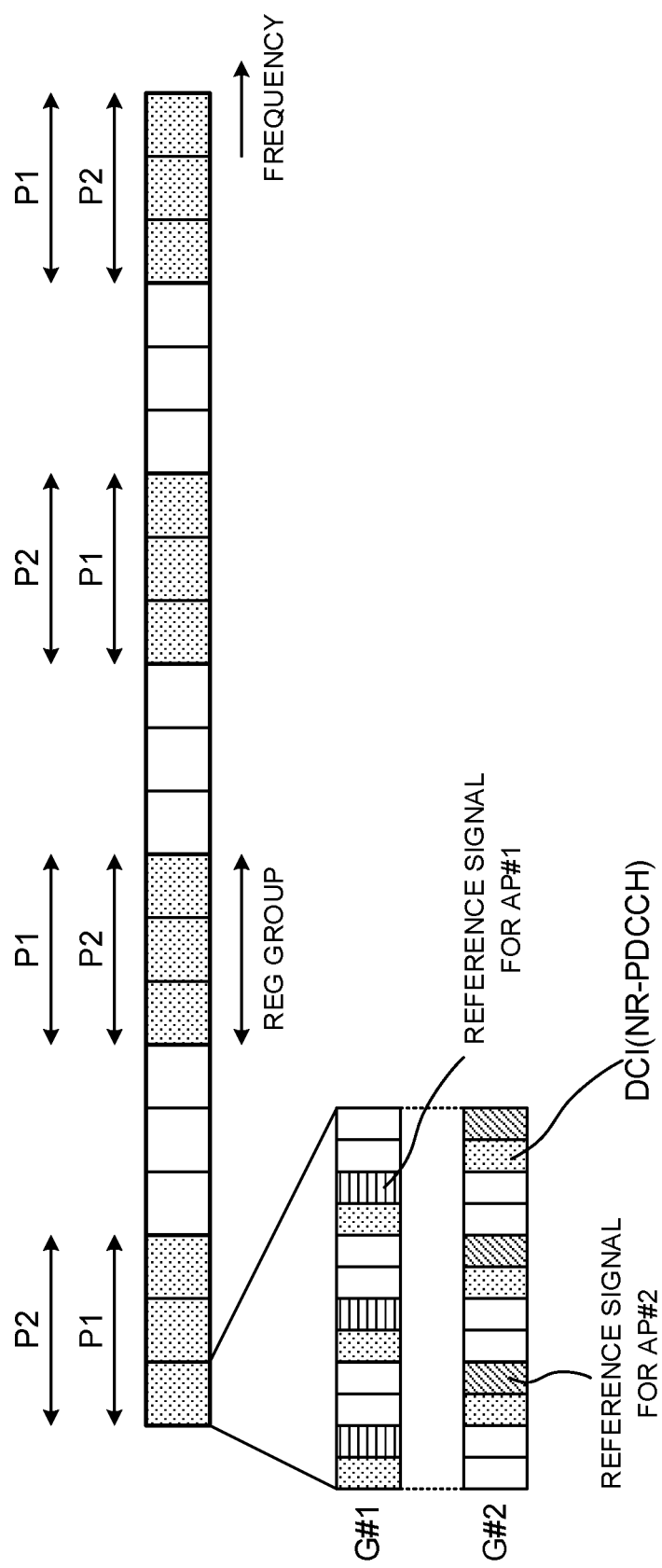
FIG. 6 is a diagram to show precoding/beamforming and another assignment of antenna ports for REG groups.

With reference to FIGS. 5A, 5B and FIG. 6 now, precoding (or beamforming) for REG groups that are mapped in distributed mapping will be described. In FIG. 5A, a plurality of REG groups #1 to #4 are distributed and arranged in a predetermined frequency field within the system band, and the same antenna port (AP1) is assigned to one NR-PDCCH candidate (or one NR-CCE candidate). Then, a plurality of precoders P1 and P2 are cyclically applied from REG group #1 to REG group #4, where NR-PDCCHs are allocated. Multiple different precoders may be randomly applied. Even when beamforming is applied from REG group #1 to REG group #4, multiple beamformings may be cyclically applied, or a plurality of different beamformings may be randomly applied, as in the case of using precoders.

The base station is highly unlikely to be able to specify which precoder or beamforming is suitable for the user terminal. In this case, the base station may apply different precoders or beamformings randomly or cyclically, so that the base station can have opportunities to apply precoders or beamforming that may be suitable for some REG group.

In FIG. 5B, a plurality of REG groups #1 to #4 are distributed and arranged in a predetermined frequency field in the system band, and a plurality of antenna ports (AP1 and AP2) are assigned to one NR-PDCCH candidate (or one NR-CCE candidate). A plurality of precoders P1 and P2 are cyclically applied from REG group #1 to REG group #4, where NR-PDCCHs are allocated. The example shown in FIG. 5B is the same as the example shown in FIG. 5A, except for the definition of antenna ports.

In FIG. 6, a plurality of REG groups #1 to #4 are distributed and arranged in a predetermined frequency field within the system band, and a plurality of REs included in one NR-REG (or REG group) are divided into a plurality of groups, and each divided group is assigned an antenna port. In the example shown in FIG. 6, one REG group is comprised of a plurality of NR-REGs (for example, three NR-REGs). A plurality of REs (for example, two groups G1 and G2) included in one NR-REG are divided into a plurality of groups.

The six REs belonging to group G1 are assigned to antenna port AP1, and the six REs belonging to group G2 are assigned to antenna port AP2. In group G1, for example, three RSs are distributed and arranged, and three DCIs are arranged. Antenna port AP1 is assigned to the RSs and DCIs of group G1. In group G2, for example, three RSs are arranged in a distributed manner and three DCIs are allocated, to REs not overlapping the REs of group G1 for RSs and DCIs, and antenna port AP 2 is assigned. Different precoders P1 and P2 (or beamformings) are cyclically applied to the DCIs of groups G1 and G2. Multiple different precoders (or beamforming) may be randomly applied. At this time, a design may be employed in which different precoders or beamformings are applied between groups G1 and G2 belonging to the same REG group.

Receiving processes for REG group #1 at the user terminal will be explained in detail. For individual NR-REGs, processes for REs belonging to group G1 linked to antenna port AP1 and processes for REs belonging to group G2 linked to antenna port AP2 are performed. For example, in the processes for REs belonging to group G1 linked to antenna port AP1, provisional channel estimation values are calculated using three RSs. For other NR-REGs belonging to same REG group #1, provisional channel estimation values are calculated using three RSs, in the processes for REs belonging to group G1. Then, the average of the provisional channel estimation values for antenna port AP1 in REG group #1 is determined, and the channel estimation value for antenna port AP1 is calculated.

Next, for the three REs where DCIs are assigned among a plurality of REs in group G1, the DCI demodulation process is executed based on the channel estimation value of antenna port AP1. Similarly, in the processes for REs belonging to group G2 linked to antenna port AP2, the channel estimation and the DCI demodulation are executed using the RS.

As a result of this, different precoders or beamformings can be applied between groups G1 and G2 (antenna ports AP 1 and AP 2) for the same REG group, so that more appropriate precoders or beamformings can be applied per REG group.

Second Aspect

With a second aspect of the present invention, an example of the relationship between control resource sets and NR-REGs will be described.

For example, in future radio communication systems, downlink control information for a given UE needs is not necessarily allocated to the whole system band and transmitted, but, transmission of downlink control information may be controlled by configuring a predetermined frequency field. The predetermined frequency field, which is configured in a UE may be referred to as a "control resource set (CORSET)," a "control subband," a "search space set," a "search space resource set," a "control field," a "control subband," an "NR-PDCCH field," and so on.

The control resource set is configured for each predetermined resource and can be configured below the system bandwidth (carrier bandwidth). For example, a control resource set may be constituted by one or more RBs (PRBs and/or VRBs) in the frequency direction.

Also, a control resource set may be defined from the perspective of the number of REG groups or the arrangement of REG groups. A control resource set is a resource frame containing CCEs or NR-PDCCHs, and can be defined based on REG groups. For example, the size of one control resource set can be configured to be an integer multiple of the size of one REG group. Also, a control resource set may be constituted by consecutive or non-consecutive resource units.

FIG. 7A shows a control resource set formed with consecutive REG groups in the system band. In the example of FIG. 7A, the size of one control resource set is four times that of one REG group. Each REG group is comprised of three NR-REGs.

FIG. 7B shows control resource sets, each constituted by a plurality of non-consecutive REG groups in the system band. In the example of FIG. 7B, one control resource set consists of four discontinuous REG groups. Each REG group is formed with three NR-REGs. One control resource set is configured to be four times the size of one REG group.

Thus, by forming control resource sets with an integer number of REG groups and arranging them in units of REG groups, radio resources can be used without waste.

Third Aspect

Now, RS patterns as arranged in NR-REGs will be described. The earlier aspects of the present invention have been described on the premise that RSs are arranged per NR-REG or per REG group, but the size of resources where RSs are mapped and the size of resources where NR-CCEs/NR-REGs are mapped need not be necessarily coincident.

According to a third aspect of the present invention, RSs for demodulating the REs included in one NR-CCE or one NR-REG are mapped beyond the resource range of these NR-CCE and NR-REG.

For example, RSs may be mapped beyond the range (frequency field) where multiple NR-REGs or CCEs are mapped. Alternatively, RSs are mapped beyond the resource range of control resource sets.

FIG. 8A shows an RS arrangement pattern in CCEs arranged in one symbol period. In the example shown in this drawing, one NR-CCE is mapped in the first OFDM symbol. This one CCE is comprised of three NR-REGs that are consecutive in the frequency domain. In the first OFDM symbol, the mapping range of RSs in the frequency domain is configured to cover the mapping range of NR-CCEs. Since one CCE is mapped in a specific field in the system band, fields are formed where NR-CCE is mapped. In the first OFDM symbol, no RS is mapped in fields a predetermined value or more apart from the mapping range of CCEs. This can reduce the RS-induced overhead.

FIG. 8B shows an RS arrangement pattern in CCEs arranged in one symbol period. In the example shown in this drawing, one CCE is comprised of three NR-REGs distributed in the frequency domain. In the first OFDM symbol, the mapping range of RSs in the frequency domain is configured to fully cover the mapping ranges of the three distributed NR-REGs.

FIG. 8C shows an RS arrangement pattern in CCEs arranged over three symbol periods. In the example shown in this drawing, NR-REGs are respectively mapped in the same frequency fields in the system band in the first to third OFDM symbols. In the first to third OFDM symbols, the mapping range of RSs in the frequency domain is configured to cover the mapping range of CCEs arranged in each symbol.

FIG. 8D shows an RS arrangement pattern in CCEs arranged over three symbol periods. In the example shown in this drawing, in the first to third OFDM symbols, each NR-REG is distributed and mapped to different frequency regions on the system band. Throughout the first to third OFDM symbols, the mapping range of RSs in the frequency domain is configured to cover each mapping range of three NR-REGs distributed in the frequency direction.

FIG. 8E shows an RS arrangement pattern in CCEs arranged over three symbol periods. Although, in the example shown in this drawing, NR-REGs are mapped to the same frequency field in the system band throughout the first to third OFDM symbols, RSs are arranged only in a limited symbol period. In the example shown in this drawing, RS are mapped in a range that convers the NR-REG of the first OFDM symbol.

The user terminal needs to identify the REs (or RE patterns) where RSs that can be used to demodulate individual REs are mapped. The relationship between the REs where RSs are mapped (RE pattern) and the REs where DCI is mapped may be defined in advance the standard so that the user terminal can recognize it beforehand, or may be configured by the signaling such as RRC signaling. As for the arrangement pattern of RSs, RSs may be arranged, for example, over the entire search space in which the NR-REG or NR-CCE is defined (included), or arranged over the entire control resource set including this search space. The user terminal performs channel estimation based on REs where RSs are mapped, finds the average (or performs the filtering process) of channel estimation values per REG group, and demodulates the REs where DCI is mapped.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 9:
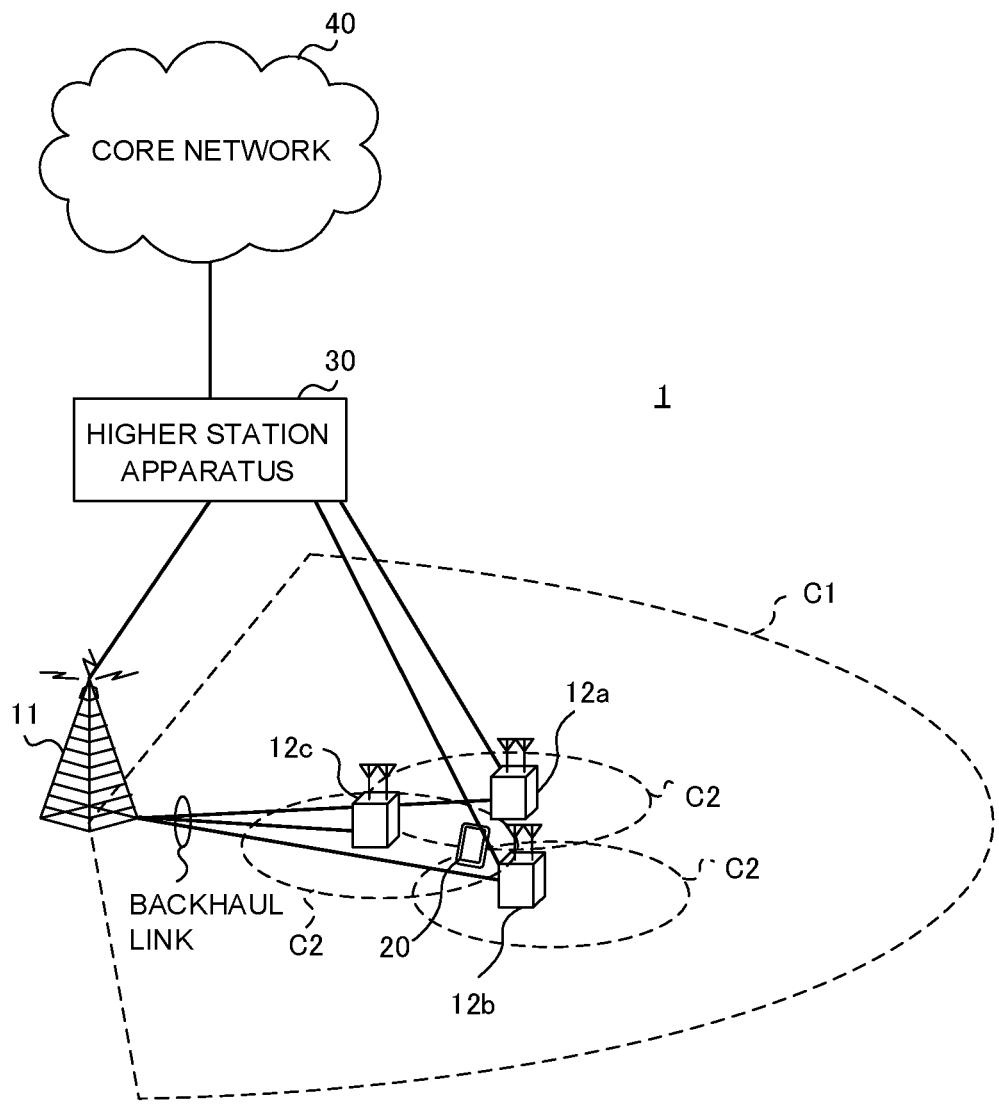
FIG. 9 is a diagram to show an example of a schematic structure of a radio communication system according to the present embodiment.

FIG. 9 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," "NR (New Radio)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 are not limited to those shown in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

The radio communication system 1 may be configured so that different numerologies are used within cells and/or between cells. Note that a numerology refers to, for example, a set of communication parameters (for example, the subcarrier spacing, the bandwidth, etc.) that are used to transmit and receive a certain signal.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
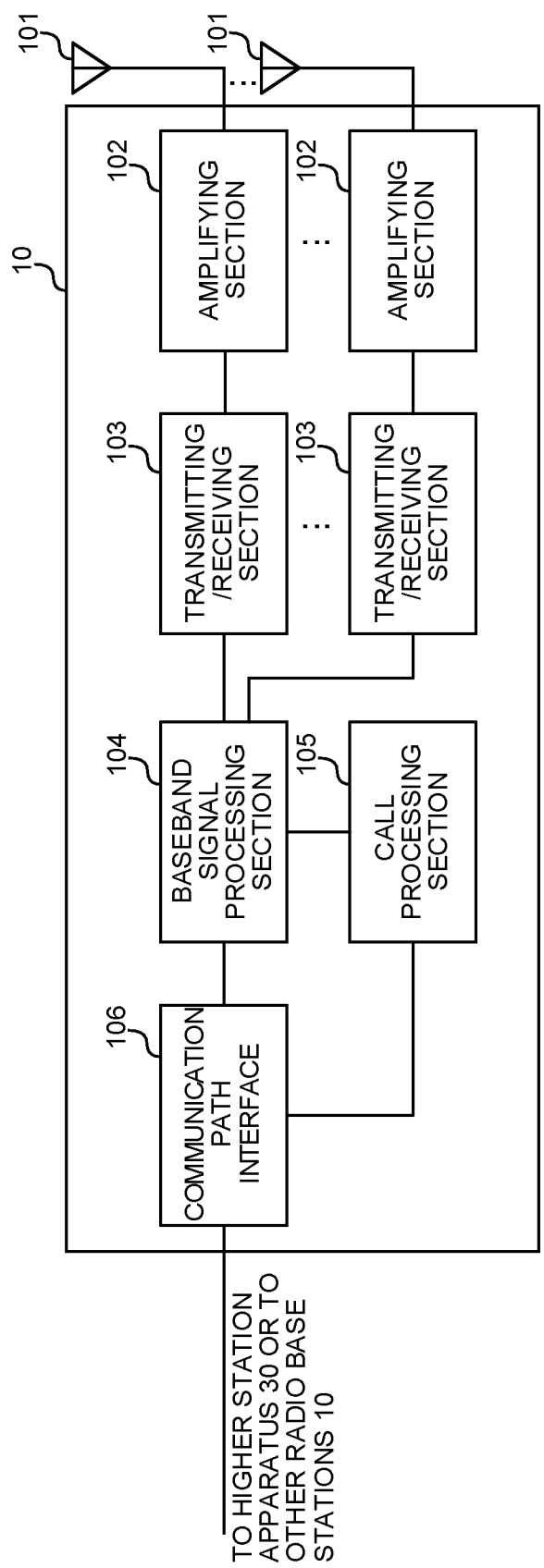
FIG. 10 is a diagram to show an example of an overall structure of a radio base station according to the present embodiment.

FIG. 10 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a downlink control channel and a reference signal that is used to receive the downlink control channel. For example, the transmitting/receiving sections 103 apply common configurations to the reference signal for use for receiving the downlink control channel and the resource blocks (RB) for allocating downlink control channel candidates, at least between two downlink control channel candidates among a plurality of downlink control channel candidates, and controls transmission.

Figure 11:
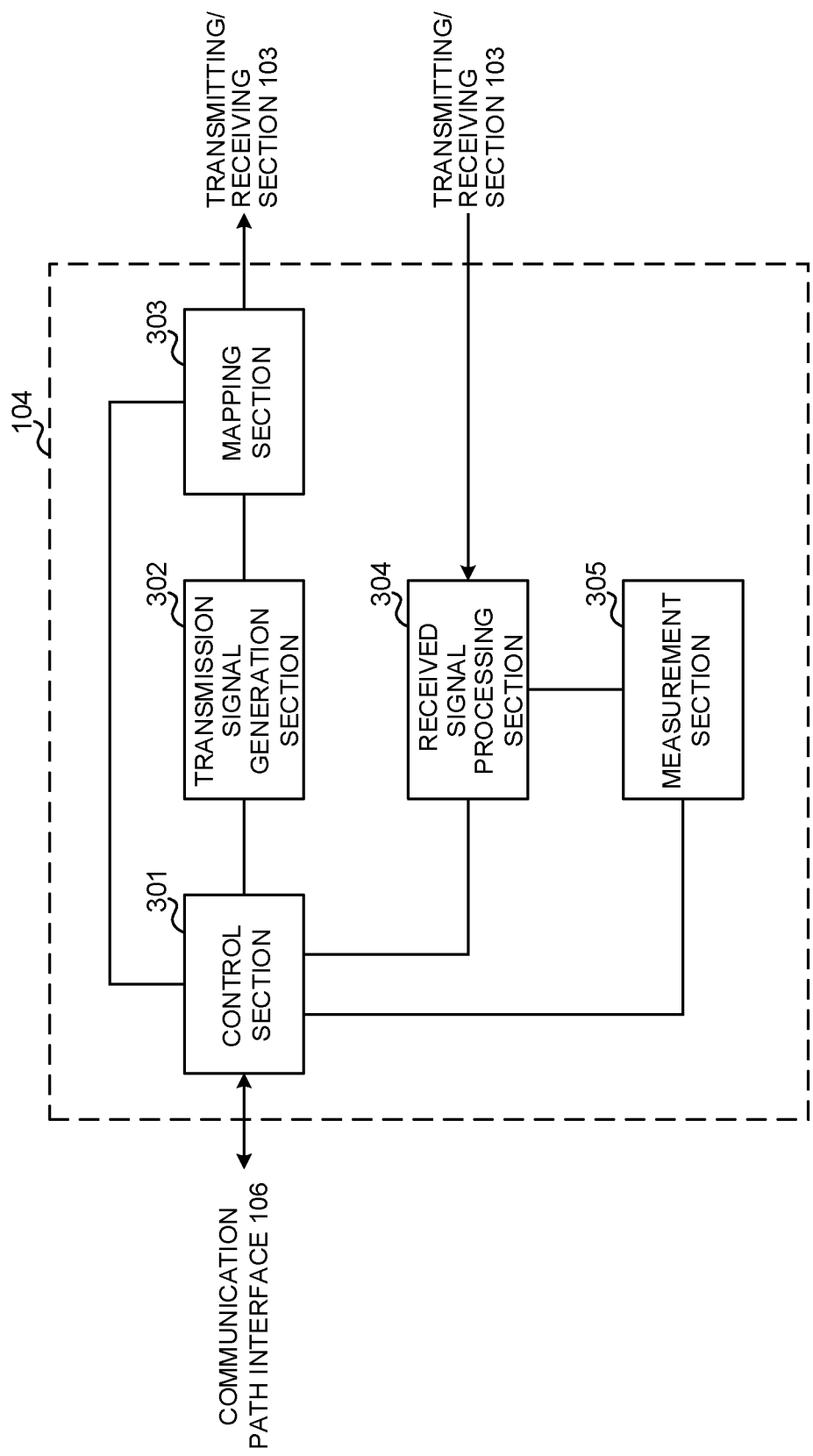
FIG. 11 is a diagram to show an example of a functional structure of a radio base station according to the present embodiment.

FIG. 11 is a diagram to show an example of a functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

The control section 301 exerts control so that downlink control information (DCI) is allocated to one of a plurality of downlink control channel candidates and transmitted. Furthermore, the control section 301 exerts control so that an NR-PDCCH, which groups a plurality of NR-REGs, is transmitted. The control section 301 may exert control so that one REG group contains multiple NR-REGs that are arranged so as to be consecutive or distributed in the frequency domain (see FIGS. 3A and 3B). Furthermore, the control section 301 may exert control so that beamforming and/or precoding, which are applied to downlink control channel on a per REG group basis, are switched (see FIG. 4 and FIG. 5). Furthermore, the control section 301 may exert control so that a plurality of REG groups #1 to #4 are distributed and arranged in predetermined frequency fields in the system band, a plurality of REs included in one NR-REG (or REG group) are divided into a plurality of groups, and antenna port assigned to each divided group (see FIG. 6). Furthermore, in the control section 301 may exert control so that RSs for demodulating the REs included in one NR-CCE or one NR-REG are mapped beyond the resource range of these NR-CCE and NR-REG (see FIGS. 8A to 8E).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to the above-described predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example CSI) and so on. The measurement results may be output to the control section 301.

(User Terminal)

Figure 12:
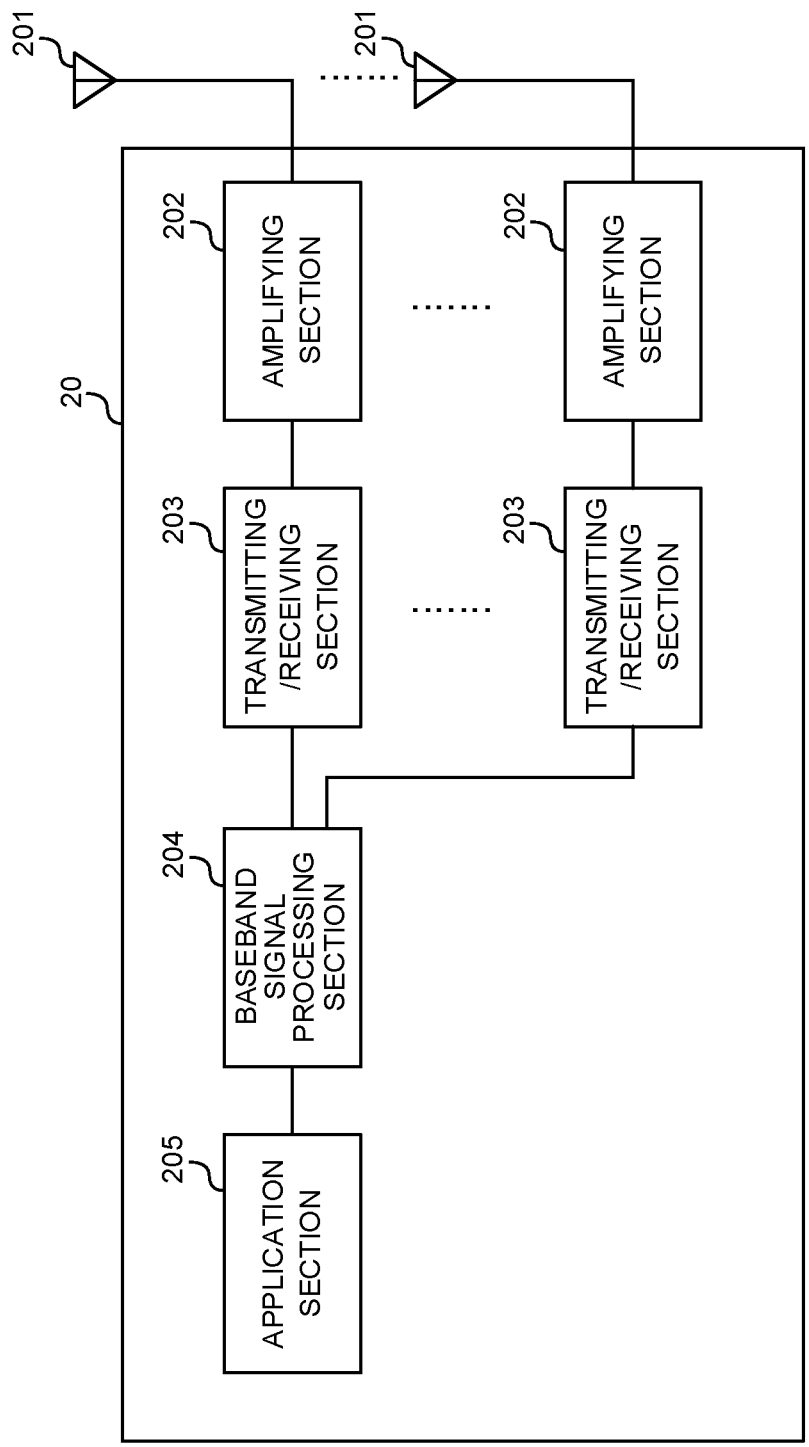
FIG. 12 is a diagram to show an example of an overall structure of a user terminal according to the present embodiment.

FIG. 12 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 receive a downlink control channel and a reference signal that is used to receive the downlink control channel. For example, the transmitting/receiving sections 203 perform receiving processes on a per REG group basis.

Figure 13:
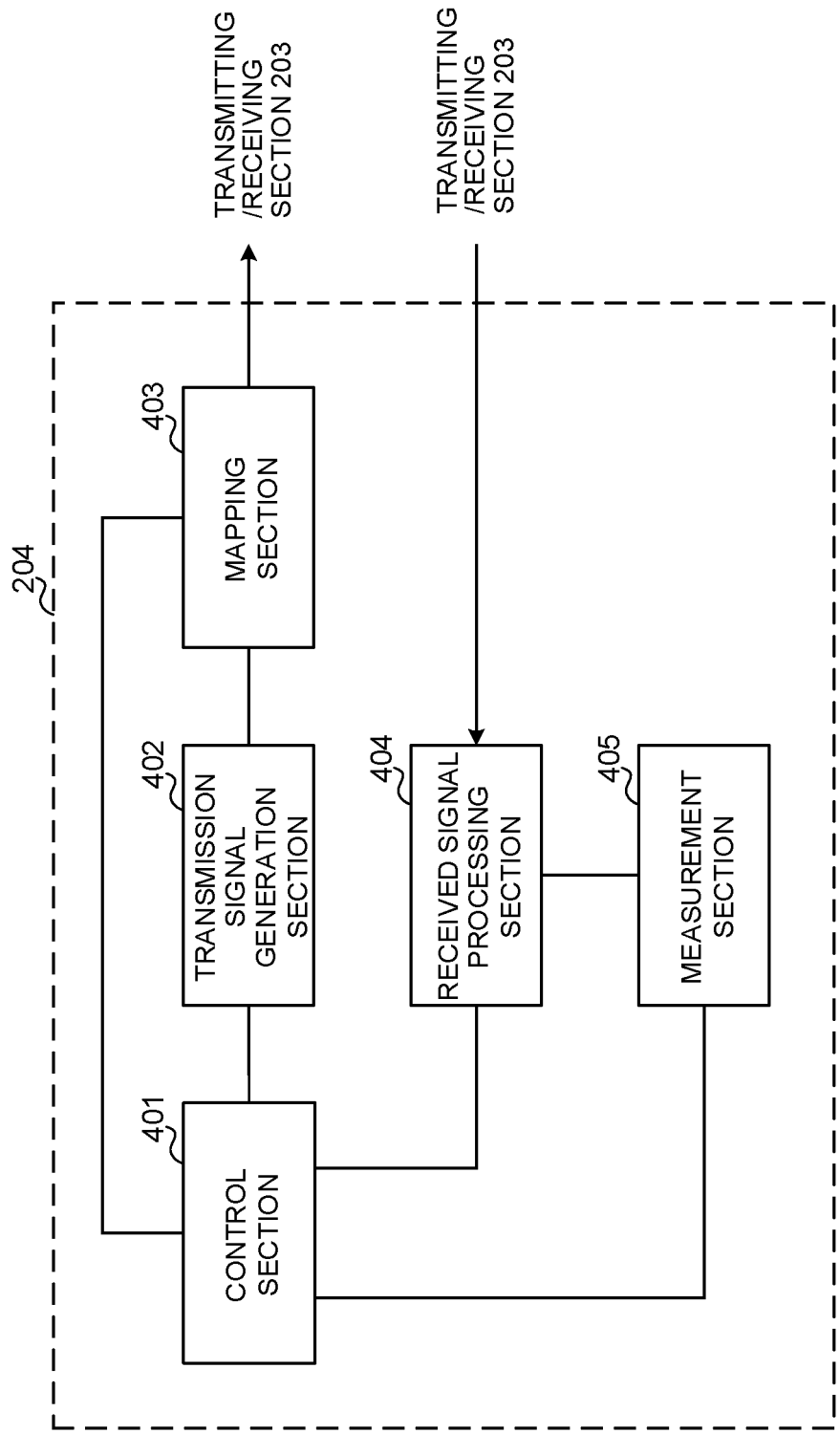
FIG. 13 is a diagram to show an example of a functional structure of a user terminal according to the present embodiment.

FIG. 13 is a diagram to show an example of a functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires downlink control signals (for example, signals transmitted in the NR-PDCCH) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 controls detection of downlink control channel candidates. For example, the control section 401 exerts control so that receiving processes are performed on a per REG group basis, and the average of channel estimation values, which are acquired from the RSs included in each REG group, is determined per REG group (or filtering is applied). Then, the control section 401 exerts control so that the REs in each REG group are demodulated using the channel estimation value of each REG group. In this way, receiving processes are performed on a per REG group basis, and this can raise the possibility that the number of RSs that can be used for channel estimation increases compared to the case where channel estimation is performed per RB, and improve the accuracy of channel estimation. Furthermore, since receiving processes are performed on a per REG group basis, it is possible to find the average of channel estimation values per REG group, so that precoding, beamforming and so on can be applied flexibly, compared to the case where the average of channel estimation values is determined over the entire system band.

Furthermore, the control section 401 controls receiving processes on the premise that RSs for demodulating the REs included in one NR-CCE or one NR-REG are mapped beyond the range of the resources of these NR-CCE and NR-REG.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
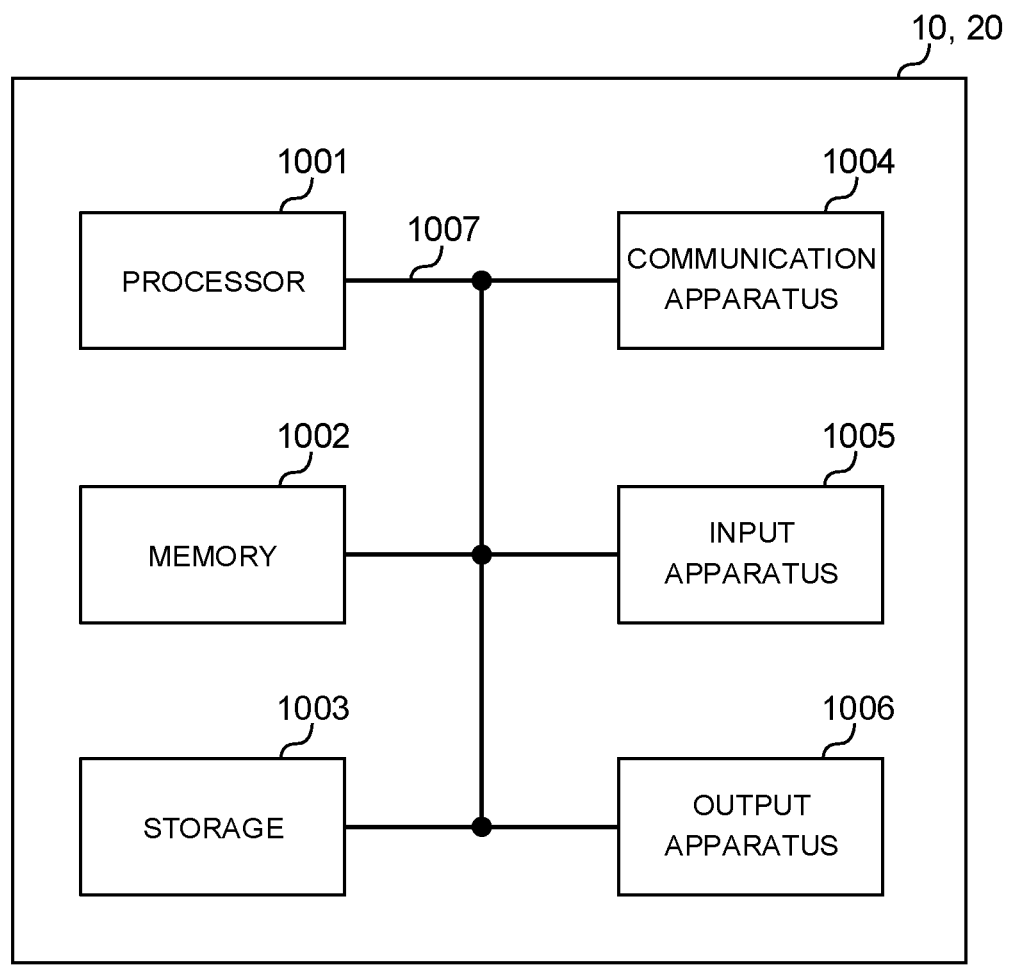
FIG. 14 is a diagram to show an example of a hardware structure of a radio base station and a user terminal according to the present embodiment.

For example, the radio base station, user terminals and so on according to embodiments of the present invention may function as a computer that executes the processes of the radio communication method of the present invention. FIG. 14 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIB s) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB,"

"eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-018953, filed on Feb. 3, 2017, including the specification, drawings and abstract, is incorporated herein by reference in its entirety.

The invention claimed is:

1. A terminal comprising:
a receiver that receives a downlink control channel consisting of a plurality of control channel elements (CCEs) to which a plurality of resource element groups (REGs) are mapped in a control resource set; and
a processor that controls a demodulation process based on a demodulation reference signal that is allocated in at least one resource element included in a plurality of REG groups, each REG group including a plurality of REGs in the control resource set, and a same precoding being applied to different REG groups within a set of consecutive resource blocks in the control resource set,
wherein the terminal is configured with a REG group size of each REG group based on information that indicates the REG group size, the information being notified by RRC signaling.

2. A base station comprising:
a processor that controls transmission of a downlink control channel consisting of a plurality of control channel elements (CCEs) to which a plurality of resource element groups (REGs) are mapped in a control resource set; and
a transmitter that transmits the downlink control channel,
wherein the processor controls to allocate a demodulation reference signal to at least one resource element included in a plurality of REG groups, each REG group including a plurality of REGs in the control resource set, and a same precoding being applied to different REG groups within a set of consecutive resource blocks in the control resource set, and
wherein the processor notifies information that indicates a REG group size to a terminal by RRC signaling.

3. A radio communication method for a terminal, comprising:
receiving a downlink control channel consisting of a plurality of control channel elements (CCEs) to which a plurality of resource element groups (REGs) are mapped in a control resource set; and
controlling a demodulation process based on a demodulation reference signal that is allocated in at least one resource element included in a plurality of REG groups, each REG group including a plurality of REGs in the control resource set, and a same precoding being applied to different REG groups within a set of consecutive resource blocks in the control resource set,
wherein the terminal is configured with a REG group size of each REG group based on information that indicates the REG group size, the information being notified by RRC signaling.

* * * * *